United States Patent [19]
Baker et al.

[11] Patent Number: 4,890,158
[45] Date of Patent: Dec. 26, 1989

[54] RECURSIVE NOISE REDUCTION FILTER FOR VIDEO TEST APPARATUS

[75] Inventors: Daniel G. Baker; William J. Cooper, both of Aloha; Bruce J. Penney, Portland, all of Oreg.

[73] Assignee: Tektronix, Inc., Beaverton, Oreg.

[21] Appl. No.: 244,876

[22] Filed: Sep. 15, 1988

[51] Int. Cl.$^4$ ............................................. H04N 17/12
[52] U.S. Cl. .................................... 358/10; 358/139; 358/167
[58] Field of Search .................. 358/139, 166, 167, 10, 358/35, 139; 324/404, 78 R

[56] References Cited

U.S. PATENT DOCUMENTS

| | | | |
|---|---|---|---|
| 4,417,270 | 11/1983 | Nagao et al. | 358/23 |
| 4,587,551 | 5/1986 | Penney | 358/10 |
| 4,745,463 | 5/1988 | Lu | 358/23 |
| 4,811,083 | 3/1989 | Matney | 358/10 |
| 4,816,897 | 3/1989 | Konishi | 358/139 X |

Primary Examiner—Howard W. Britton
Assistant Examiner—Mark R. Powell
Attorney, Agent, or Firm—Francis I. Gray

[57] ABSTRACT

A recursive noise reduction filter for video components reduces the noise bandwidth of a signal without degrading the signal spectrum. Demodulated chrominance or peak detected chrominance from a video signal output by a video system in reponse to a video test signal is input to the recursive noise reduction filter which acts as a comb filter to suppress noise significantly at frequencies other than harmonics of the horizontal line rate. The signal is scaled by a first attenuator having a scaling factor of $(1-a)$, where (a) is less than one, and input to a summing circuit. Also input to the summing circuit is a delayed signal from a prior horizontal line scaled by the scaling factor (a). The output of the summing circuit is a filtered output signal. The signal is sampled only during horizontal lines that have the video test signal and is stored for subsequent accumulation with other horizontal lines also having the video test signal. The fitler serves to add the vertically correlated part of the signal corresponding to the video test signal while averaging out the noise, thus improving the overall signal to noise ratio without degrading the signal spectrum and, hence, enhancing differential gain and phase measurements.

19 Claims, 3 Drawing Sheets

1

RECURSIVE NOISE REDUCTION FILTER FOR VIDEO TEST APPARATUS

BACKGROUND OF THE INVENTION

The present invention relates to the measurement of parameters of a video system, and more particularly to a recursive noise reduction filter for video components that reduces the effective noise bandwidth of the video components without degrading the signal spectrum to enhance the ability to measure differential errors of the video system.

In a video system there are two luminance dependent chrominance signal distortions in a video signal: differential gain and differential phase. Differential gain is a change in color subcarrier amplitude as a function of luminance so that in the reproduced color picture the saturation is distorted in the areas between the light and dark portions of the scene. Differential phase is a phase modulation of the chrominance signal by the luminance signal so that in the reproduced color picture the hue varies with scene brightness. Differential gain and differential phase may occur separately or together and are caused by amplitude nonlinearity and time delay that are not independent of the signal level. To measure these parameters a modulated ramp or staircase video test signal that requires a relatively large horizontal bandwidth is input to the video system, and the chrominance demodulated signal from a resulting video signal output from the video system is amplified by a very large gain factor, generally in excess of thirty times. The measurement of these parameters in the presence of noise is difficult primarily for two reasons. First the signal to noise ratio (S/N) suffers due to the high gain of the demodulators to obtain the desired resolution needed for most measurements since differential gain and phase errors are generally small; and second a relatively large horizontal noise bandwidth is required to pass the test signal without distorting the measurement, further degrading the S/N. An example of a differential gain/phase display having significant noise and small errors is illustrated in FIG. 1 where the noise effectively masks the signal to be measured.

The differential gain and differential phase measurements are even more difficult where the video system is a video tape recorder (VTR) with a typical S/N of 45 to 50 dB. The measurement difficulty also is increased when the line select mode is used since the test pattern, the vertical interval test signal (VITS), occurs at only one line per frame, i.e., at 30 Hz, rather than at every line (full field), i.e., at 15.734 kHz. The full field test signal allows an operator to integrate the Gaussian distribution of the noise with the eye. However, in line select mode the human eye is unable to integrate sufficient samples to observe the Gaussian distribution. Other differential measurements include luminance to chrominance group delay in response to a modulated sine-squared test signal.

Therefore what is desired is a method of measuring differential error characteristics of a video system in response to a vertically coherent video test signal with enhanced accuracy in the presence of noise by reducing the noise bandwidth without degrading the signal spectrum.

SUMMARY OF THE INVENTION

Accordingly the present invention provides a recursive noise reduction filter for video components that reduces the noise bandwidth of a signal without degrading the signal spectrum. Demodulated video components, such as chrominance or peak detected chrominance, is input to the recursive noise reduction filter which acts as a comb filter to suppress noise significantly at frequencies other than harmonics of the horizontal line rate. The signal is input to a first attenuator having an attenuation factor of $(1-a)$ and the attenuated signal is input to a summing circuit for addition to an attenuated, delayed output of the summing circuit, the second attenuation factor being $(a)$ and the delay being one horizontal video line. The input data is sampled during the active video portion of the input signal, and in a line select mode during the active video portion of one specified line per frame, and accumulated for each consecutive line or for each corresponding line per frame. The filter serves to add vertically correlated portions of the input signal while averaging out the noise component of the input signal. The result is an enhanced signal to noise ratio without degrading the input signal, improving the accuracy of the differential error measurements.

The objects, advantages and other novel features of the present invention are apparent from the following detailed description when read in conjunction with the appended claims and attached drawing.

DESCRIPTION OF THE PREFERRED EMBODIMENT

Figure 1:
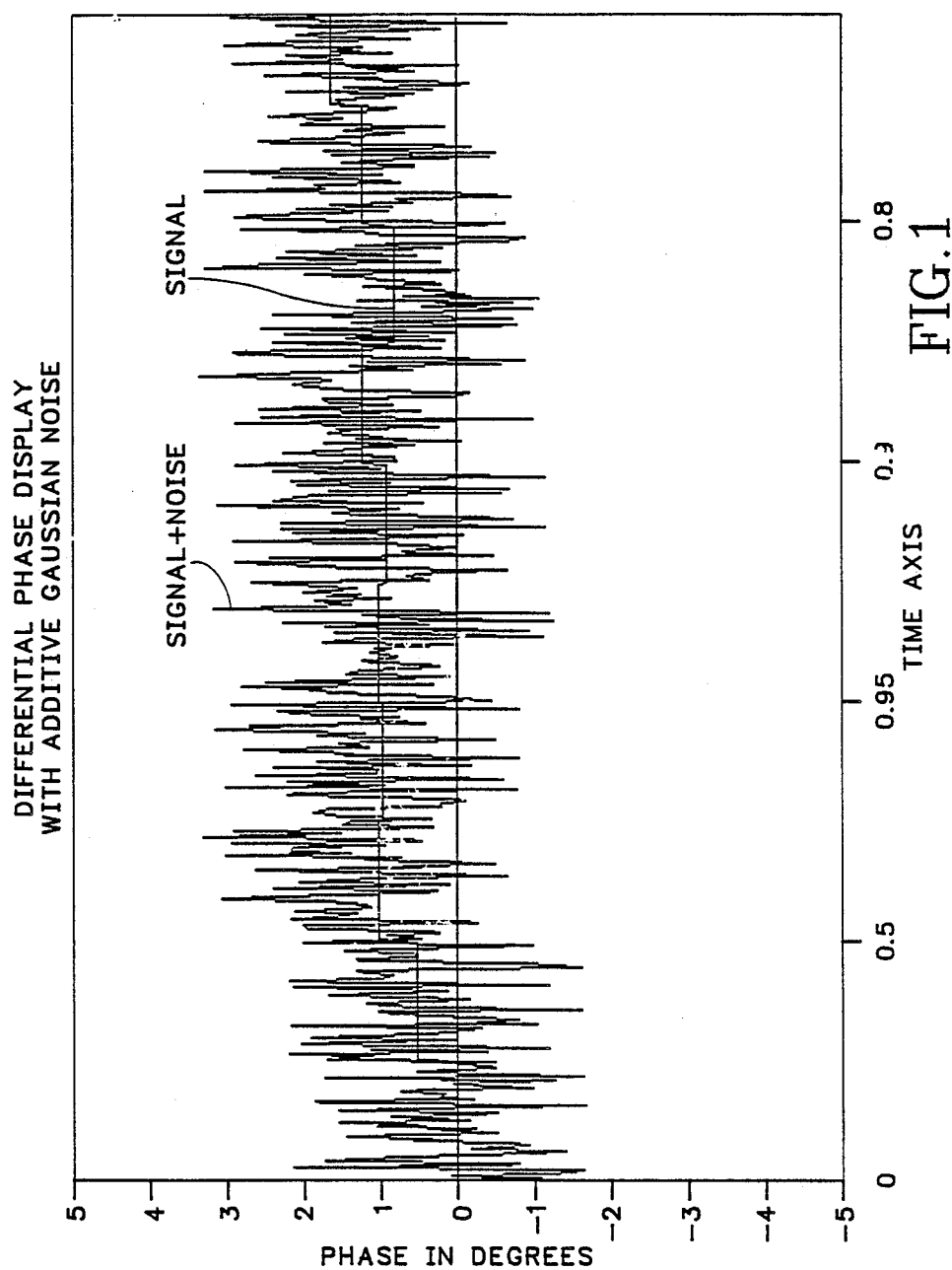
FIG. 1 is a display view of a differential gain or differential phase signal provided by the prior art.
Figure 2:
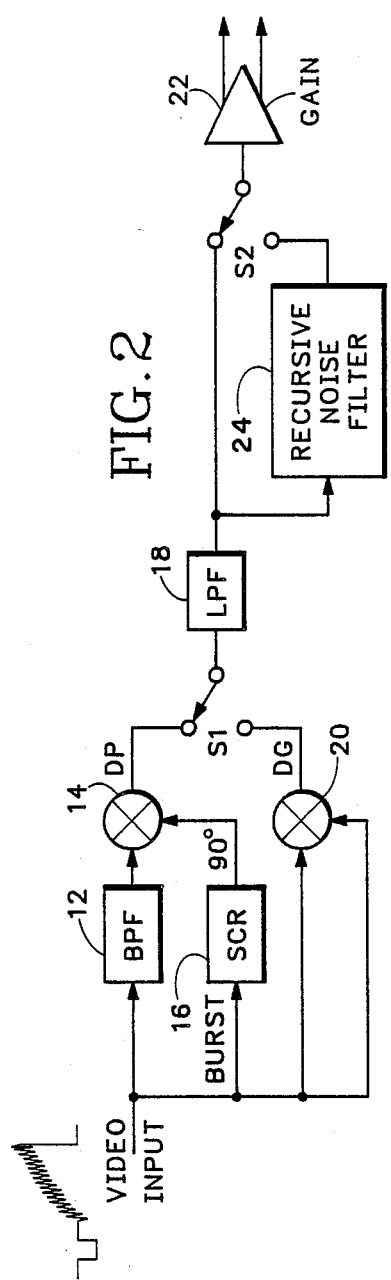
FIG. 2 is a block diagram of an instrument for measuring differential gain and differential phase using the present invention.

Referring now to FIG. 2 for a differential gain or differential gain error measurement a video input signal, such as a modulated ramp signal as shown or a modulated staircase signal, is input to a chrominance bandpass filter 12 that passes the chrominance component to a demodulator 14. The burst portion of the video input signal is input to a subcarrier regeneration circuit 16 to provide a subcarrier frequency phase shifted by ninety degrees for input to the demodulator 14. The output of the demodulator 14 is a differential phase signal DP that ideally is zero volts d.c. The DP signal is input to a switch S1. The video input signal also is input to a squaring circuit 20 which acts as an envelope detector to produce a differential gain signal DG that ideally has a constant d.c. voltage level. The differential gain signal also is input to the switch S1. The differential phase or gain signal from the switch S1 is filtered by a low pass filter 18, typically at either 500 kHz for NTSC or 800 kHz for PAL, to eliminate high frequency components while retaining the basic differential phase or gain signal spectrum. In the prior art the output of the filter 18 is passed directly to a gain stage 22 that drives the vertical deflection of a display device (not shown). In the present instance the output of the filter 18 is input to a second switch S2 and to a recursive noise filter 24. The output of the recursive noise filter is input to the second switch S2, the output of which is input to the gain stage 22.

Figure 3:
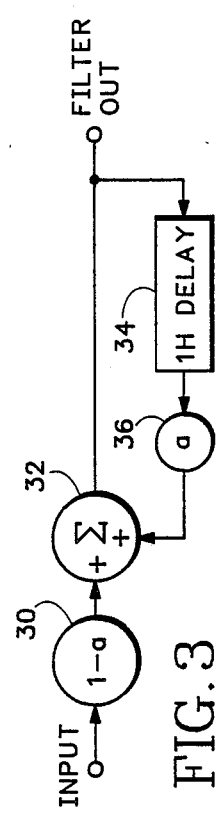
FIG. 3 is a conceptual block diagram of the recursive noise filter according to the present invention.

A one-line recursive filter is shown in FIG. 3. The video input signal is scaled by an attenuator circuit 30 having a scaling factor of $(1-a)$ where (a) is a value less than one. The scaled video input signal, $(1-a)Vin(k)$, is input to a summing circuit 32 to produce a filter output voltage, $Vo(k)$, k being the index number of the current horizontal line being input to the filter. The filter output voltage is input to a delay device 34 having a delay time equal to one horizontal video line and scaled by a second attenuator circuit 36 having a scaling factor of (a). The delayed scaled filter output voltage, $aVo(k-1)$, is input to the summing circuit 32 to produce the filter output voltage:

$$Vo(k) = (1-a)Vin(k) + aVo(k-1)$$

or $$Vin(k) = \{Vo(k) - aVo(k-1)\}/(1-a).$$

The step response of this filter with a feedback ratio of $a=0.95$ results in a settling time of approximately $k=100$ horizontal lines to approach one percent of the final value. For a full field test signal this results in virtually an instantaneous response to an observer.

Figure 4:
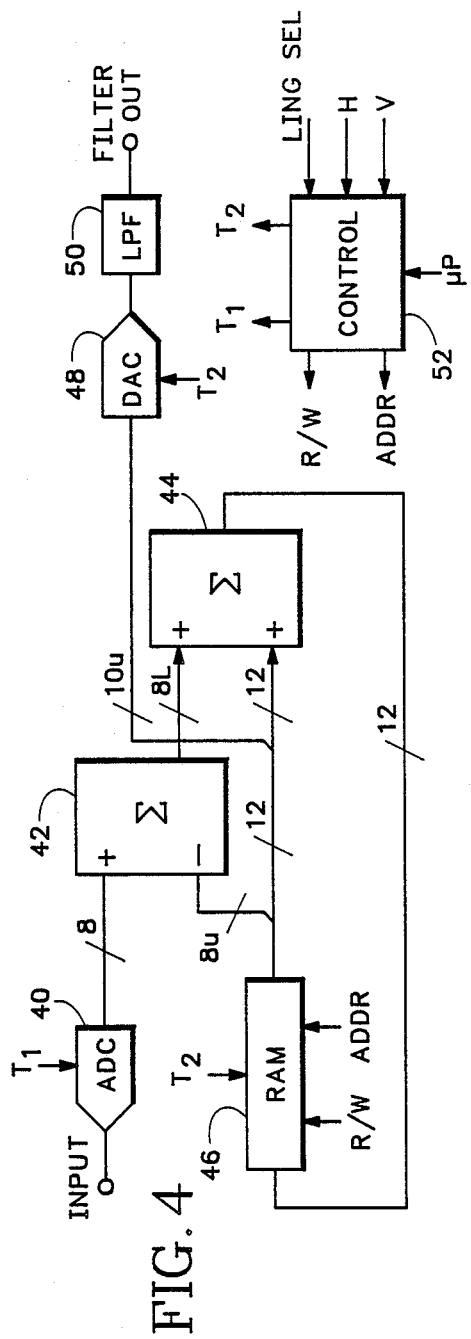
FIG. 4 is a block diagram of a digital recursive noise filter according to the present invention.

A vertical interval test signal (VITS) is essentially an impulse signal since it occurs once per field, with the result that the signal is severely attenuated and smeared through the field. Therefore to approach the step response function the filter is configured to sample only during the lines when the VITS is present, so the data in the delay device 34 is stored until the next VITS line. To achieve this result a digital coder/decoder (CODEC) and memory (RAM), as shown in FIG. 4, are used to allow selective sampling and retain the necessary damping, a, to achieve a desired S/N improvement.

The demodulated chrominance signal, either the differential gain or the differential phase signal, is input to an analog to digital converter (ADC) 40. If the input to the ADC 40 is considered to be a twelve-bit input, then an eight-bit output from the ADC is equivalent to dividing the input by one-sixteenth or to $a=15/16=0.9375$. The output of the ADC 40 is input to a first summing circuit 42, the output of which is input to a second summing circuit 44. The output of the second summing circuit 44 is a twelve-bit value that is input to a storage device 46. The output of the storage device 46 is input to the second summing circuit 44, is input to a digital to analog converter (DAC) 48, and the most significant bits of the output are input to the first summing circuit 42. The combination of the two summing circuits 42 and 44 provides the equivalent of scaling the filter output by the factor a. The output of the DAC 48 is filtered by a lowpass filter 50 to provide the filter output voltage for further amplification and display. A controller 52 receives inputs from a microprocessor (not shown), a line select mode signal determining whether full field or VIT processing is to be used, and horizontal and vertical sync signals. The controller 52 outputs timing signals T1 and T2 to the ADC 40, and the DC 48 and RAM 46, respectively. The controller 52 also addresses the RAM 46 ahd determines whether to write data into or read data from the RAM.

The timing signal T2 divides the horizontal line into an integer number of data bins, such as $2^n$, that are correlated independently of each other. The timing signal T1 samples the filter input only during the desired horizontal line(s) to assure vertical correlation of the data being stored in the RAM 46. The R/W command from the controller 52 to the RAM 46 serves to write data into the RAM only when a new vertically correlated horizontal line is sampled by the ADC 40, and freezes the output of the RAM for reading during the remaining horizontal lines to provide a persistent display in the line select mode.

Figure 5:
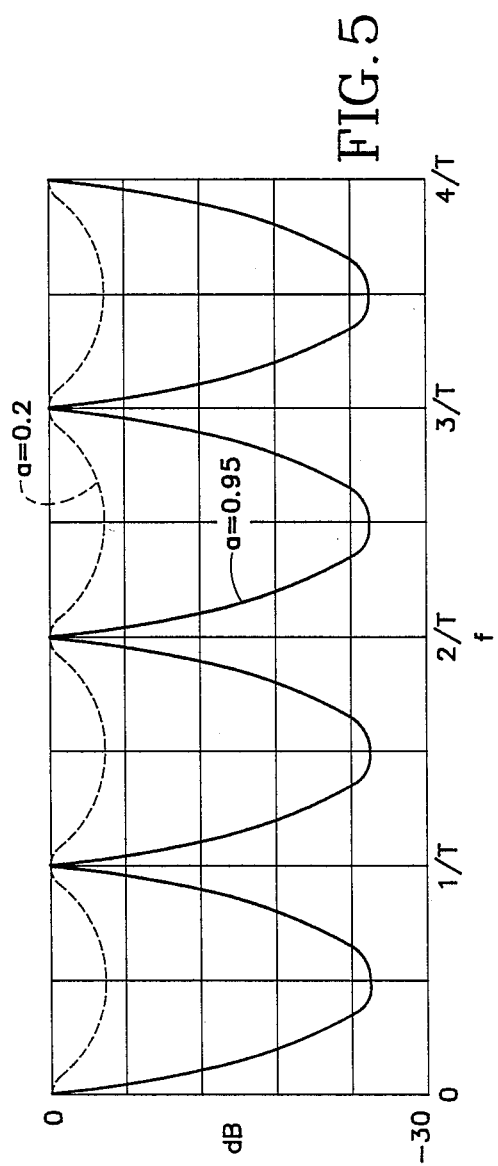
FIG. 5 is a graphic view of the frequency response of a recursive noise filter according to the present invention.

The resulting filter characteristics are shown in FIG. 5 for two different values of the scaling coefficient a. The closer a approaches one, the greater the attenuation of the random noise becomes. The correlated data occurs at the horizontal line rate and harmonics thereof, while random noise occurs throughout the frequency spectrum. If T is the horizontal line period, it is clear that the filter response resembles a comb filter. The result is an improvement in S/N of approximately 15 dB for $a=0.95$ if the noise spectrum is that for essentially "white" noise.

Although the present invention has been described for a particular application, i.e., the measurement of differential phase and gain for a demodulated chrominance signal, it is equally applicable to other demodulated test signal displays, such as a modulated sine-squared signal for determining luminance to chrominance group delay and the like that are vertically correlated. The baseband demodulated signal is input to the recursive noise filter as described above prior to display in order to provide a reduced noise display for test and measurement purposes.

Thus the present invention provides a recursive noise filter for video components that reduces the noise bandwidth of a demodulated chrominance signal without degrading the correlated differential gain or differential phase component of the signal by sampling the signal during a vertically coherent test signal, either full field or single line.

What is claimed is:

1. An apparatus for measuring a characteristic of a video system in response to a vertically coherent video test signal comprising:
   means for generating a demodulated signal from an output video signal of the video system corresponding to the video test signal; and
   means for reducing the noise bandwidth of the demodulated signal without degrading the signal spectrum of the demodulated signal.

2. An apparatus as recited in claim 1 wherein the reducing means comprises a recursive noise filter having a comblike frequency characteristic so as to integrate vertically correlated portions of the demodulated signal that occur at a horizontal line rate while averaging the noise content of the demodulated signal.

3. An apparatus as recited in claim 1 further comprising means for selecting between characteristics of the reducing means depending upon whether the video test signal is a full field test signal occurring in each horizontal line within an active video portion of the output video signal or a single line test signal occurring in a specified line of each frame of the output video signal.

4. An apparatus as recited in claim 2 wherein the recursive noise filter comprises:
   means for summing two input signals to produce a filter output signal;

means for delaying the filter output signal by a period equal to a single horizontal line interval to produce a delayed filter output signal; and means for scaling the delayed filter output signal by a scaling factor to produce a scaled delayed filter output signal that is one input to the summing means, and for scaling the filter input signal by a complement of the scaling factor to produce a scaled filter input signal that is the other input to the summing means, the scaling factor having a value less than one.

5. An apparatus as recited in claim 4 wherein the recursive noise filter further comprises means for storing the delayed filter output signal for a period equal to the period between consecutive horizontal lines having the video test signal.

6. An apparatus as recited in claim 5 wherein the recursive noise filter further comprises means for outputting the filter output signal continuously between the horizontal lines having the video test signal.

7. An apparatus as recited in claim 2 wherein the recursive noise filter comprises:

a video codec for encoding the demodulated signal as a digital input signal and decoding a digital output signal into the filter output signal;

recirculating means for storing a digital sum signal, and for delaying the digital sum signal for a period equal to a horizontal line interval; and means for summing the digital input signal with the output of the storing and delaying means to produce the digital output signal and the digital sum signal.

8. An apparatus as recited in claim 7 wherein the video codec comprises:

an analog to digital converter to convert the demodulated signal to the digital input signal; and a digital to analog converter to convert the digital output signal to the filter output signal.

9. An apparatus as recited in claim 7 wherein the summing means comprises:

means for subtracting from the digital input signal a scaled digital output signal from the storing and delaying means to produce an error signal; and means for additively combining the error signal with the digital output signal to produce the digital sum signal.

10. An apparatus as recited in claim 7 further comprising means for continuously outputting the digital output signal from the storing and delaying means in the absence of the digital input signal.

11. An improved apparatus for measuring a characteristic of a video signal output from a video system in response to a vertically coherent video test signal input to the video system, the improved apparatus being of the type having means for generating a demodulated signal from the video signal, and means for amplifying the demodulated signal prior to display, wherein the improvement comprises means for reducing the noise bandwidth of the demodulated signal without degrading the signal spectrum of the demodulated signal, the reducing means having a comblike filter transformation characteristic that passes frequencies at harmonics of the horizontal line interval and attenuates frequencies between the harmonics.

12. An improved apparatus as recited in claim 11 further comprising means for selecting between characteristics of the reducing means depending upon whether the video test signal is a full field test signal occurring in each horizontal line within an active video portion of the video signal or a single line test signal occurring in a specified line of each frame of the video signal.

13. An improved apparatus as recited in claim 11 wherein the reducing means comprises:

means for summing two input signals to produce a filter output signal;

means for delaying the filter output signal by a period equal to a single horizontal line interval to produce a delayed filter output signal; and means for scaling the delayed filter output signal by a scaling factor to produce a scaled delayed filter output signal that is one input to the summing means, and for scaling the demodulated signal by a complement of the scaling factor to produce a scaled filter input signal that is the other input to the summing means, the scaling factor having a value less than one.

14. An improved appratus as recited in claim 13 wherein the reducing means further comprises means for storing the delayed filter output signal for a period equal to the period between consecutive horizontal lines having the video test signal.

15. An improved apparatus as recited in claim 14 wherein the reducing means further comprises means for outputting the filter output signal continuously between the horizontal lines having the video test signal.

16. An improved apparatus as recited in claim 11 wherein the reducing means comprises: a video codec for encoding the demodulated signal as a digital input signal and decoding a digital output signal into the filter output signal;

recirculating means for storing a digital sum signal, and for delaying the digital sum signal for a period equal to a horizontal line interval; and means for summing the digital input signal with the output of the storing and delaying means to produce the digital output signal and the digital sum signal.

17. An improved apparatus as recited in claim 16 wherein the video codec comprises:

an analog to digital converter to convert the demodulated signal to the digital input signal; and a digital to analog converter to convert the digital output signal to the filter output signal.

18. An apparatus as recited in claim 16 wherein the summing means comprises:

means for subtracting from the digital input signal a scaled digital output signal from the storing and delaying means to produce an error signal; and means for additively combining the error signal with the digital output signal to produce the digital sum signal.

19. An apparatus as recited in claim 16 further comprising means for continuously outputting the digital output signal from the storing and delaying means in the absence of the digital input signal.

* * * * *